Jan. 28, 1936.  O. F. MOTTWEILER  2,029,081
MACHINE FOR MAKING INSULATING MATERIAL
Filed May 6, 1933   5 Sheets-Sheet 5
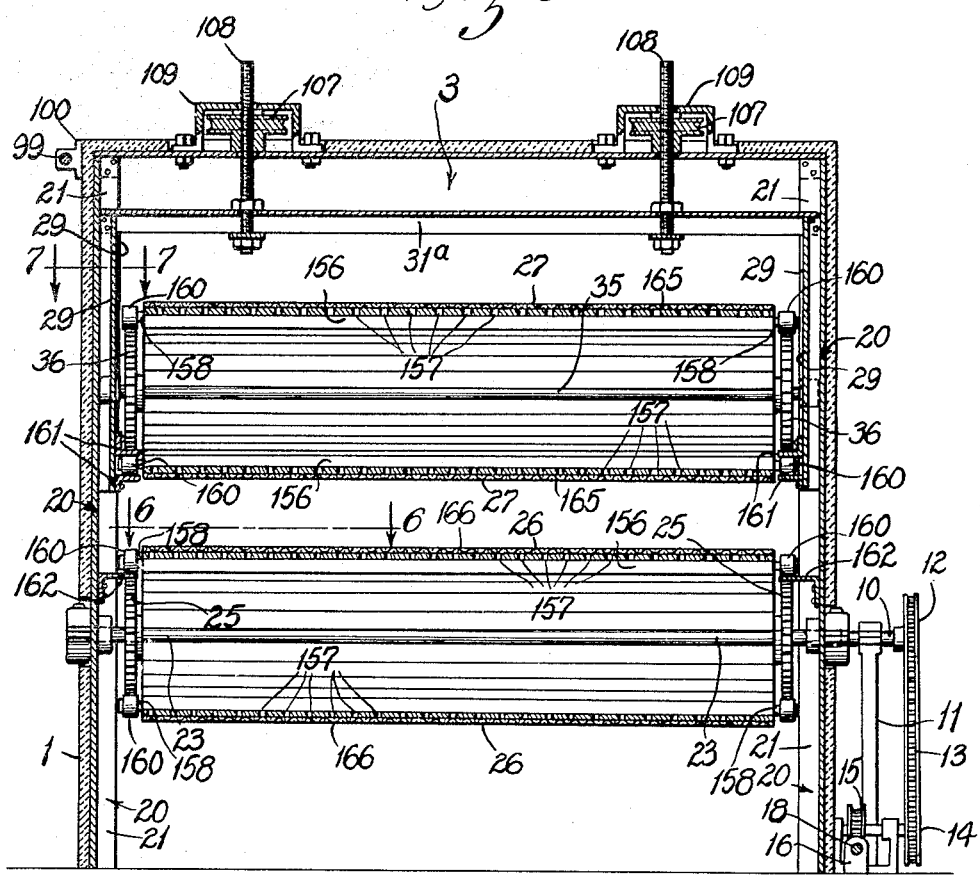
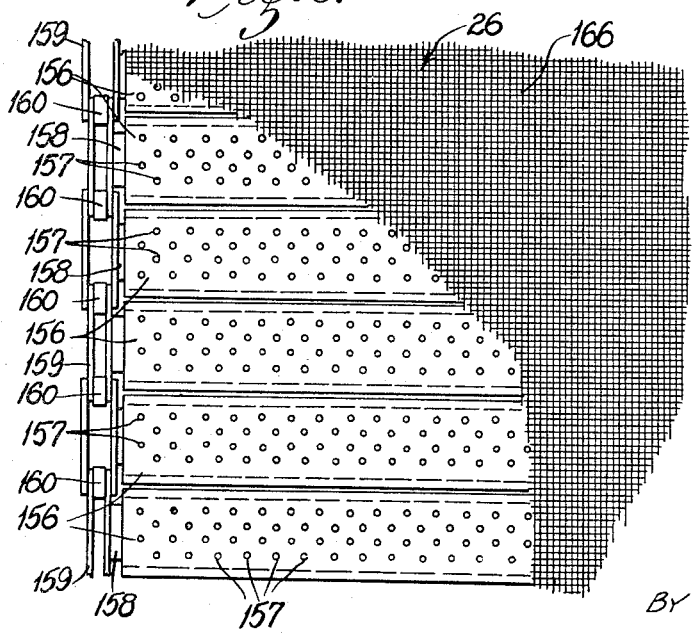
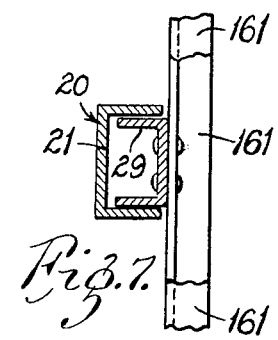
INVENTOR:
OLIVER F. MOTTWEILER
By Bruce A. Elliott
ATTORNEY.

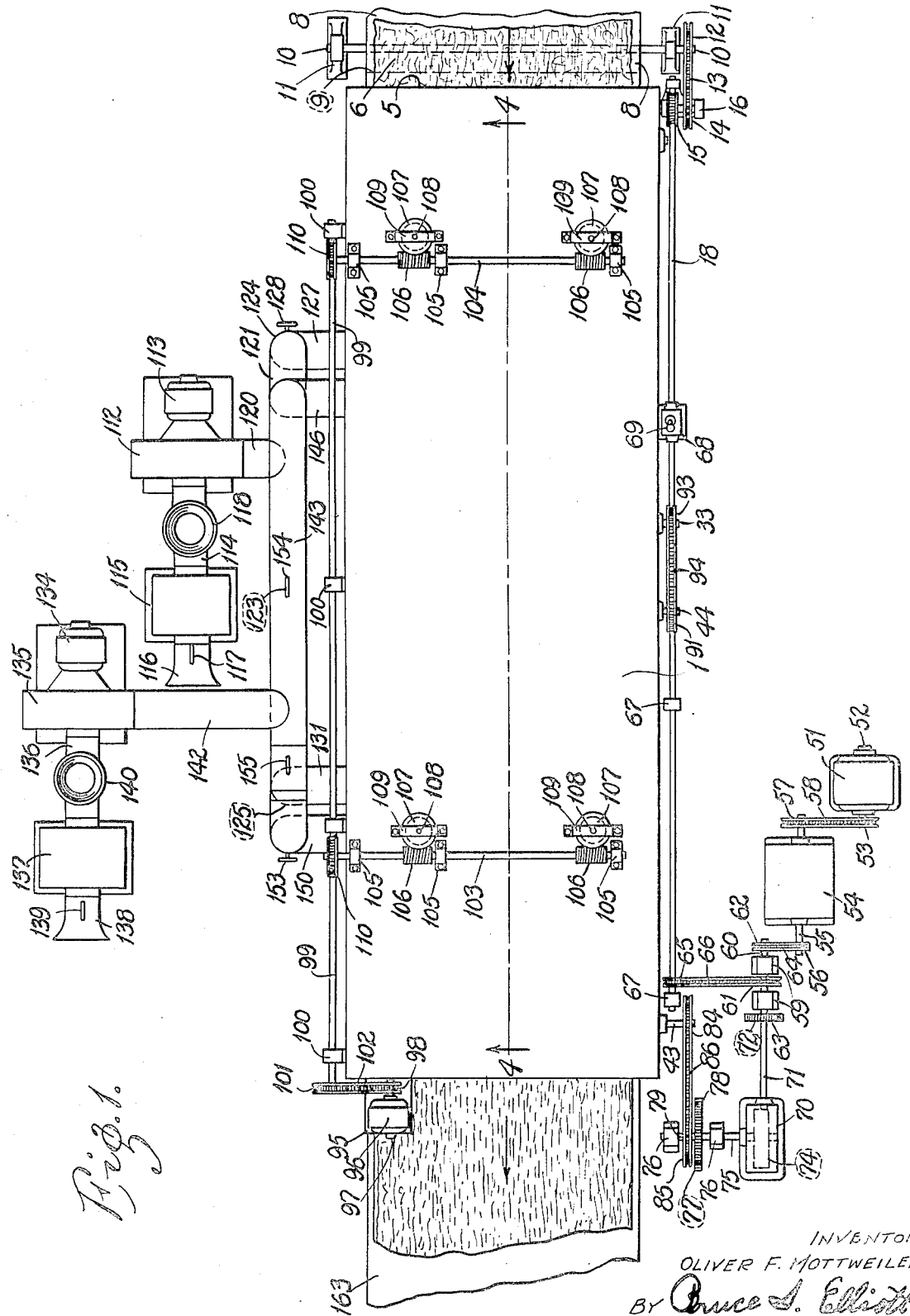

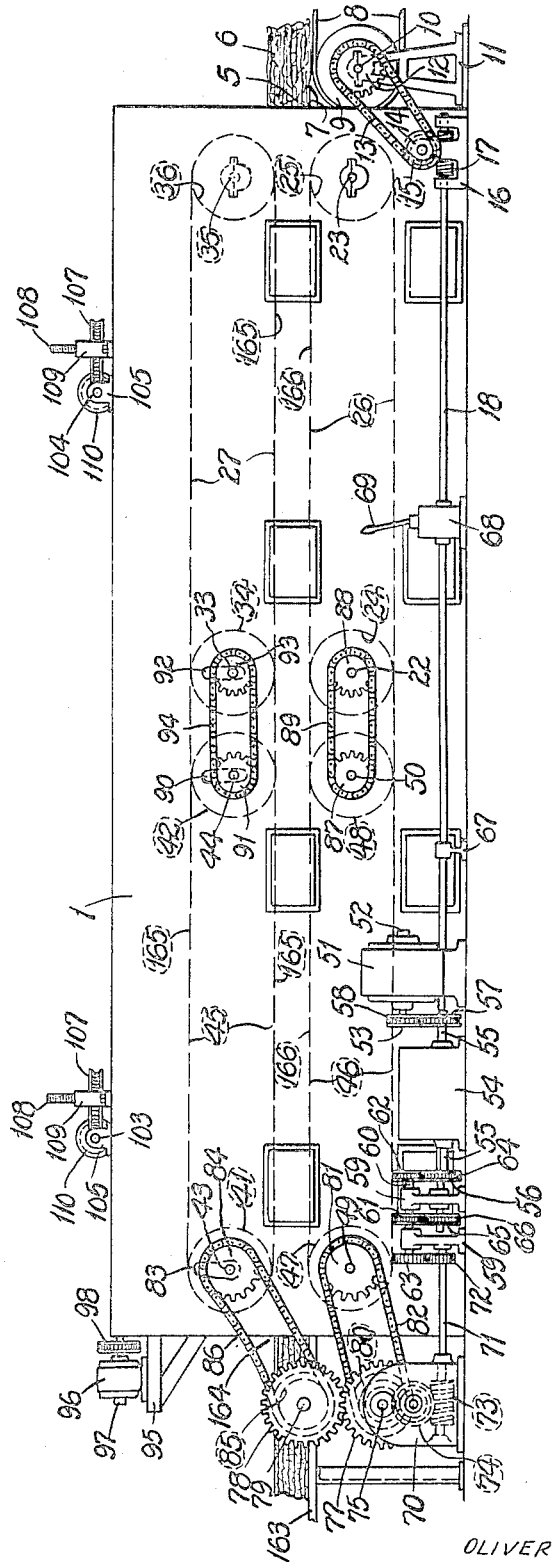

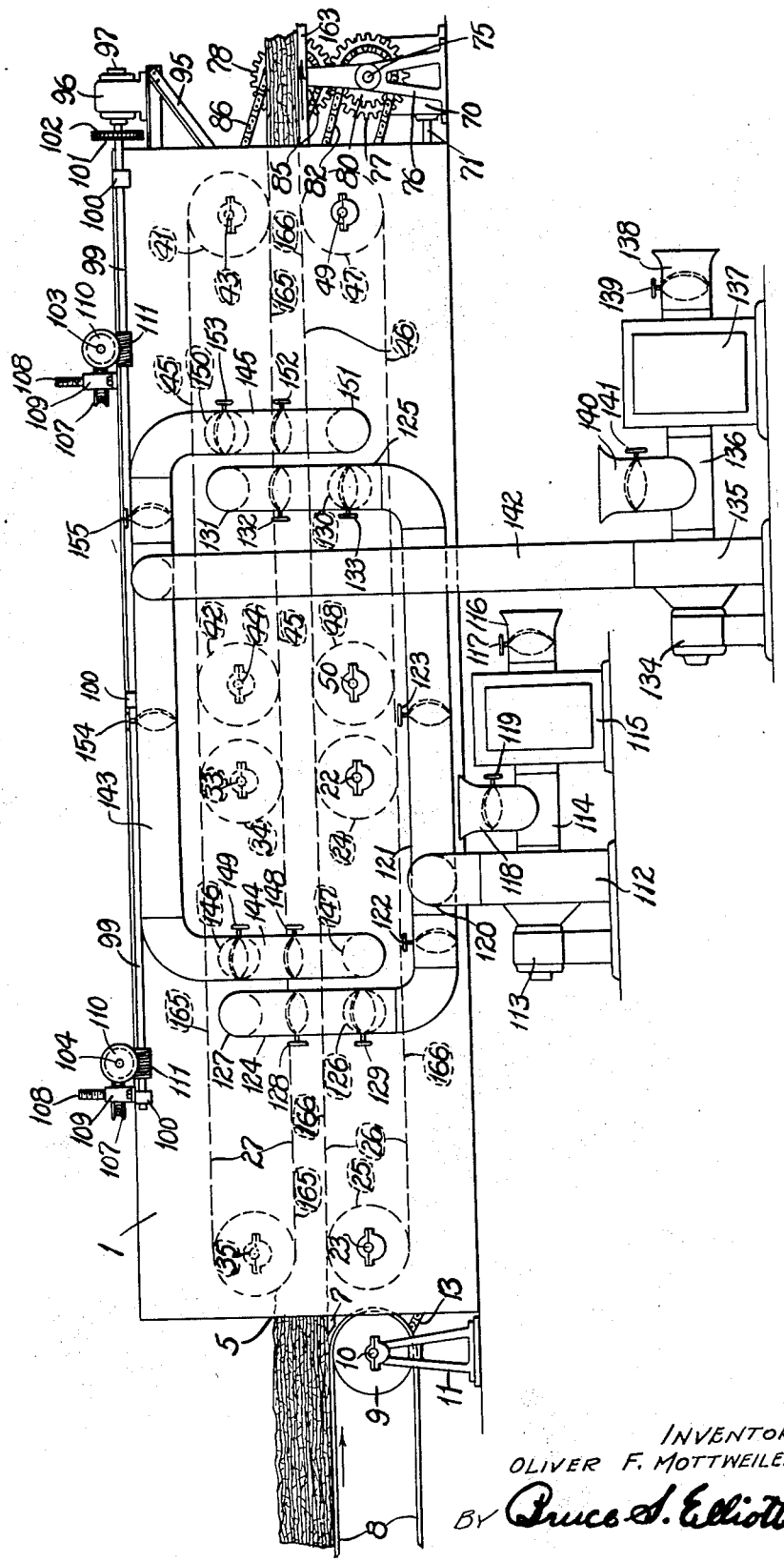

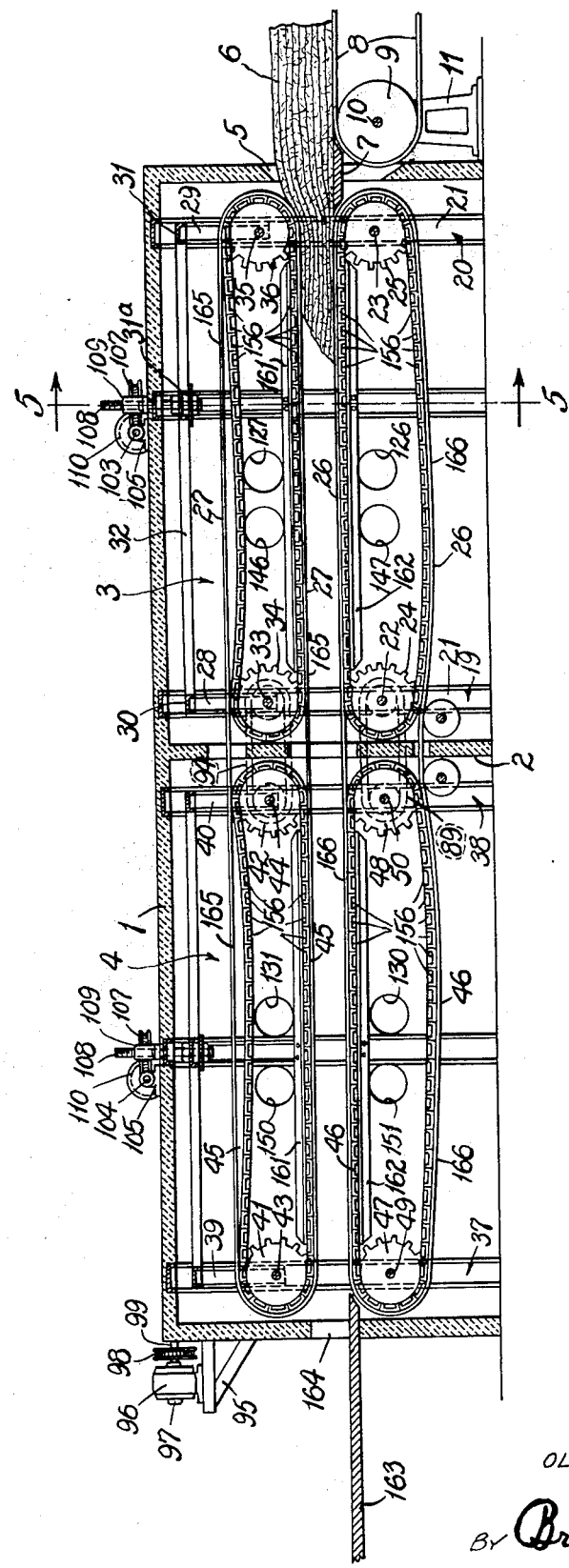

Patented Jan. 28, 1936

2,029,081

UNITED STATES PATENT OFFICE 2,029,081

MACHINE FOR MAKING INSULATING MATERIAL

Oliver F. Mottweiler, Alexandria, Ind.

Application May 6, 1933, Serial No. 669,672

8 Claims. (Cl. 154—27)

This invention relates to novel apparatus for use in making insulating material in the form of boards, sheets, or blocks, and has for its general object to provide a machine of this character which, in a continuous operation, will enable such insulating elements to be constructed of any desired density, thickness and width, and to be delivered in commercial form.

Specific objects of the invention relate to novel means for compressing the insulating material to a desired density and thickness; to novel means for heating or cooling, or both heating and cooling, the insulating material while the same is being transported through the machine under pressure; to novel means for adjusting one element, or half, of an endless compressing mechanism toward or from its companion element; and to various novel details of construction, and combinations and operations of parts, whereby the general objects of the invention are attained.

The basic material which I prefer to employ in manufacturing the insulating boards, and the like, is mineral wool, which may be produced in the usual way by directing a blast of steam or air against a stream of molten rock, slag, or other appropriate material. When made from molten rock, as in the case of the material which I prefer to employ, the product is known in the art as "Rock wool". However, the invention is not limited to the use of mineral wool, as any other suitable fibrous material might be employed.

In the practice of my invention, the fibrous material employed is first saturated, or the fibers thereof coated, with a suitable stiffening agent, or binder, such, for example, as asphalt, and this may be accomplished in the manner described in my pending application, Serial Number 596,719, filed March 4, 1932; or in that of the application of Mottweiler and Richardson, Serial Number 643,694, filed November 22, 1932. The mineral wool combined with the asphalt, or other binder, is then passed into my improved apparatus where it is compressed to a desired density and simultaneously while under pressure, subjected to the action of a medium capable of setting the binder. This is preferably accomplished by subjecting the material first to the action of heated air having such force as to enable it to penetrate the coated insulating material and to dry or set the same, and then, in like manner, to the action of cold air. The degree of temperature of the heated air will be varied in accordance with the use to which the insulating material is to be put. For example, if the material is intended for high temperature insulation, as in covering steam pipes, it is desirable that the heat employed should be sufficient to drive off all volatile substance from the binder, as otherwise a disagreeable odor would be produced by the heat acting on the material. On the other hand, when low temperature insulation is in question, as in covering pipes in refrigerating plants, better results are secured when the binder is left in a more or less plastic condition.

Similar reasons dictate the employment of cold air. While in practically all cases where the hot air is employed, cold air will subsequently be employed to cool the product so that it may be conveniently handled by hand upon delivery from the machine, certain types of binders do not require a high degree of heat, and no cold air need be employed; while with other binders only cold air will be required.

My improved machine is so designed that the heating and cooling devices, and the speed at which the material travels through the heating and cooling chambers, are under complete control of the operator.

The accompanying drawings illustrate a practical embodiment of the invention, but I wish it understood, that the invention is not limited to the particular construction of the machine illustrated, as I am aware that various changes in and modifications of the machine herein illustrated and described, could be made without departing from the broad idea of my invention as outlined in the claims appended to this application.

In said drawings:—

Figure 1 is a top plan view of a machine constructed according to my invention;

Figure 2 is a view in side elevation;

Figure 3 is a similar view but looking at the opposite side of the machine from that illustrated in Figure 2;

Figure 4 is a longitudinal section taken on the line 4—4 of Figure 1;

Figure 5 is a cross-sectional view taken on the line 5—5 of Figure 2 and viewed in the direction of the arrow;

Figure 6 is a plan view on an enlarged scale showing a portion of one of the endless compressing elements; and Figure 7 is a section taken on line 7—7 of Figure 5.

Referring now to the drawings, the numeral 1 indicates the casing of the machine, which is preferably rectangular in cross-section, as indicated in Figure 5, and is of much greater length than height. Located centrally of the casing is a partition, 2, provided with openings to accommodate certain moving parts hereinafter referred to, and which partition divides the casing into a heating chamber, 3, and a cooling chamber, 4. At one end of the casing, that at the right in Figure 4, there is provided an inlet opening, 5, for the entrance of the insulating material, 6, to be acted on by the compressing, heating and cooling means within the casing. I have shown adjacent to the inlet opening a support, 7, for the insulating material and adjacent said support one end of an endless carrier, 8, for continuously delivering the insulating material onto the support 7 and thence into the casing. The carrier 8 is shown as passing over a pulley, 9, the shaft, 10, of which is supported bearings on a frame, 11. Mounted on one end of the shaft 10, Figures 1 and 2, is a sprocket, 12, over which passes a sprocket chain, 13. This sprocket chain is driven by a small sprocket wheel, 14, which is fast on the shaft of a worm gear, 15, which members are rotatably supported in a frame, 16. The worm gear 15, is adapted to be driven by a worm, 17, on one end of a line shaft, 18, the end of this shaft being also supported in the frame, 16.

According to my invention, I provide means in the form of endless compressors for compressing the insulating material to any required density and thickness, a pair of these compressors being located in each of the chambers 3 and 4. Referring to Figures 4 and 5, the numerals, 19, 20, indicate upright parallel rectangular frame members mounted near opposite ends of the heating chambers 3, the side members 21 of each frame being in the form of channel bars, as indicated in Figure 7. Supported in suitable bearings in the side bars of the frame 19 and 20, toward the lower end of said frames, and extending between the same are shafts, 22, 23, on the outer ends of each of which are mounted a pair of sprocket wheels 24 and 25. Extending over and between the two sets of sprocket wheels is an endless chain compressing member, 26, a portion of which, on an enlarged scale, is shown in Figure 6, and will later be described. The numeral 27, indicates a companion compressor to the compressor 26 and is adapted to be adjusted toward and from the latter. To this end, I provide a rectangular frame comprising relatively short angle bars, 28 and 29, which, as shown in Figures 4, 5 and 7, are slidably mounted in the angle bars 21 of the frames 19 and 20. The respective sets of angle bars 28 and 29 are connected at their upper ends by transverse cross bars 30 and 31, and by longitudinal frame members 32. Mounted in the lower end of each pair of frame bars 28, is a shaft 33, having mounted thereon near its opposite ends, a pair of sprocket wheels 34. Mounted in the lower end of each pair of angle bars 29 is a shaft, 35, having mounted near its ends a pair of sprocket wheels, 36. Thus, when the angle bars 28 and 29 are raised or lowered in the frames 19 and 20, by the means hereinafter described, as these angle bars carry the sprocket wheels 34 and 36, on which the endless chain 27 is mounted, this upper compressor, or the lower run thereof, will be moved toward or from the lower compressor 26.

The construction and arrangement of compressors in the chamber 4 are the same as those just described, and the corresponding parts will be briefly identified without going into a detailed description. The main supporting frames for the compressors are indicated, respectively, by the numerals 37 and 38, the sliding frames, or angle bars, by the numerals 39 and 40; the adjustable sprockets by the numerals 41, 42, the shafts thereof by the numerals 43 and 44, the upper chain compressor by the numeral 45, the lower compressor by the numeral 46, the respective sets of sprocket wheels supporting the latter by the numerals 47 and 48, and the shafts for said latter sprockets by the numerals 49 and 50. In order to simultaneously drive the endless chain members of the two sets of compressors, I provide the following arrangement.

The numeral 51, Figures 1 and 2, indicates a motor, on one end of the shaft, 52, of which is a sprocket, 53. The numeral 54 indicates a variable speed device of conventional construction, having a shaft, 55, secured on opposite ends of which are sprockets 56 and 57. The shaft 55 is driven from the motor 51 by means of a sprocket chain 58, passing over the sprockets 53 and 57. Mounted in supports 59, is a shaft, 60, mounted on which are sprockets, 61 and 62 and a gear, 63, the sprockets 62 being at one end of the shaft and the gear 63 at the opposite end. The shaft 60 is driven by a sprocket chain, 64, passing over the sprockets 56 and 62. Mounted on the end of the line shaft 18, previously referred to, is a sprocket, 65, and said shaft is driven from the shaft 60 by means of a sprocket chain, 66, passing over the sprockets 61 and 65. The shaft 18 is mounted at one end in one of the supports 67, and at its opposite end in the frame 16, previously referred to, and has one or more intermediate supports, 67. Interposed in the length of the line shaft is a clutch, 68, having an operating lever, 69. By moving this lever to engage or disengage the clutch, the movement of the endless carrier 8 may be controlled. The endless compressors, previously described, and illustrated in Figure 4, are designed to travel at a relatively slow rate of speed. To this end, I provide a speed reducer, 70, shown at the left of Figures 1 and 2, having a shaft, 71, mounted at one end in one of the supports 59, and having mounted near such end a pinion, 72, in mesh with the gears 63. The shaft 71 extends into the casing of the speeed reducer 70, and the speed reduction is preferably accomplished by a worm, 73, provided on the shaft 71, which is in mesh with a worm wheel, 74, which imparts motion to the driving elements of the compressors. These will now be described.

The worm wheel 74 is mounted on a shaft, 75, supported in bearings in the casing of the speed reducer at one end, and beyond the speed reducer, from the inner side of the latter, is mounted in supports, 76. Secured on the shaft 75 is a gear 77, which is in mesh with a gear, 78, secured on a shaft, 79, which shaft is also mounted in the supports 76 in vertical alignment with the shaft 75. Secured on the shaft 75 is a sprocket, 80, shown by dotted lines in Figure 2. The shaft 49 of the lower endless compressor 46, projects through one of the side walls of the casing; and is provided on its projecting end with a sprocket, 81. A sprocket chain, 82, passes over the sprockets 80 and 81, whereby shaft 49 will be rotated from the worm wheel 74 to drive the endless compressor 46. The shaft 43, mounted in bearings in the sliding frame 39, has one end projecting through a vertical slot, 83, in the side wall of the casing 1, which projecting end is provided with a sprocket, 84. Mounted on the shaft 70 is a sprocket, 85, a sprocket chain, 86, being passed over the respective sprockets 84 and 85, whereby the shaft 43 will be rotated from the shaft 75 to drive the endless compressor 45.

In order to drive the compressor 26 in unison with, and at the same rate of speed as the compressor 46, I extend one end of each of the shafts 50 and 22 through a side wall of casing 1 and mount on such projecting ends sprockets of equal size, indicated, respectively, by the numerals, 87, and 88. Passing over these sprockets is a sprocket chain, 89. In this way, shaft 22 is rotated at an equal rate of speed with shaft 50 when the sprocket wheels 48 on the latter are rotated by the movement of the endless compressor 46.

The endless compressor 27 is driven in a similar manner to that just described from the shaft 44 of the compressor 45. That is to say, the shaft 44 of compressor 45 is extended through a slot 90, Figure 2, in a side wall of casing 1, and provided with a sprocket, 91; and the shaft 33 of compressor 27 is extended through a similar slot, 92, in said wall, and such projecting end provided with a sprocket, 93. A sprocket chain, 94, passes over the sprockets 91 and 93, which are of equal size, and also of equal size with the sprockets 87 and 88, whereby, as will be understood, the compressor 27 will be driven from shaft 44 of compressor 45 and at the same rate of speed as the compressor 45. The respective sets of sprocket wheels 41—42, 47—48, 34—36, 24—25, are all of the same size, as are the sprockets 81 and 84, and the gears 77 and 78, and hence all of the endless compressing members will be driven simultaneously in the same direction and at the same rate of speed. In order to simultaneously raise the upper compressing elements 27 and 45 relative to the lower stationary compressing elements 26 and 46, to regulate the density or thickness of the insulating material being shaped and compressed, I provide the following mechanism:

Mounted on a bracket support, 95, secured near the top of casing 1 at the left hand end thereof, as shown in Figures 1, 2 and 4 is a motor, 96, the shaft 97 of which is provided with a sprocket, 98, on its inner end. Extending along the rear side of casing 1 is a line shaft, 99, supported in bearings, 100, mounted on the rear wall of casing 1. One end of this shaft, that at the left in the figures named, has secured thereon a sprocket, 101, in line with the sprocket 98, and a sprocket chain, 102, Figure 1, passes over these sprockets, whereby line shaft 99 may be driven from motor 96. Extending transversely across the top of casing 1, are two cross-shafts 103, 104, located, respectively, toward opposite ends of the casing, and supported in bearings, 105. Each of these shafts is provided with two worms, 106, which are in mesh with worm wheels, 107, each of which has screw-threaded engagement with a screw-threaded rod, 108, the lower ends of which are secured in cross frame bars 31ª (Figure 5) connecting the respective longitudinal frame members 32. The rods 108 are mounted at their upper ends in strap bearings, 109, which house the worm wheels 107. Each of the cross shafts 103 and 104 is provided on its inner end with a worm wheel, 110, which engage worms, 111, Figure 3, provided on the line shaft 99.

From the foregoing description, it will be seen that when the motor 96 is caused to run in one direction or the other, being controlled, as usual, by a reversing switch, (not shown), the worm wheels 107 will be turned in one direction or the other by the line shaft 99 and the worm drives described, to cause the screw-threaded rods 108 to be raised and lowered, which will cause the frames 28—39 and 39—40 to be correspondingly raised and lowered, thus moving the compressors 27 and 45 toward or from the compressors 36 and 46.

I find that sufficient slack may be provided in the sprocket chain 86 to permit the shaft 43 to be raised and lowered in the slot 83; but if desired, any conventional type of adjustable chain tightener could be applied to the sprocket chain 86 to provide for the adjustment of shaft 43.

As heretofore stated, one of the principal objects of the invention is to permit the insulating material to be heated and cooled, either or both, while passing through the machine and being held under compression by the two sets of endless compressors. The construction and arrangement of parts for accomplishing this object will now be described:

Referring more particularly to Figures 1 and 3, the numeral, 112, indicates a combined suction and blow fan operated by a motor, 113, and having an air duct, 114, leading from a heater, 115, having an air inlet, 116, provided with a damper, 117. Communicating with the air duct 114 is a branch pipe, 118, leading to the open air and provided with a damper, 119. Leading from the casing of fan 112 is a pipe, 120, which communicates with an air duct, 121, provided on opposite sides of the pipe 120, with dampers 122 and 123. The air duct 121 is provided at opposite ends with vertical extensions, 124 and 125, respectively, the vertical pipe 124 having branch pipes 126 and 127 which communicate with the interior of heating chamber 3 in the space between the runs of the two compressors 26 and 27, as indicated in Figure 4. A damper, 128, is interposed in the duct 124 between the inlets 127 and 128; and a damper, 129, controls the inlet to the branch pipe 126. The vertical extension 125 of air duct 121 is provided with branch pipes, 130 and 131, which communicate with the cooling chamber 4 between the runs of the respective compressors 45 and 46. A valve, 132, is interposed between the inlet pipes 130 and 131 and a valve, 133, controls the inlet pipe 130. In order to provide for the successive use of hot and cold air in the respective chambers 3 and 4, or for the use of hot and cold air in both chambers or to permit various gradations of temperature to be employed in either or both chambers, I employ a second system for injecting air under control as to temperature into the respective chambers 3 and 4. Referring to Figures 1 and 3, the numeral 134 indicates a motor for driving a fan 135, from the inlet to which a pipe, 136, leads to a heater, 137. Communicating with this heater is an air inlet pipe, 138, provided with a damper, 139. Communicating with the air pipe 136 is a branch pipe, 140, open to the outer air and having a damper 141. Extending upward from the outlet of fan 135 is an air pipe, 142, which communicates at its upper end with a horizontally-disposed pipe, 143, having downwardly extending extensions, 144 and 145, respectively. Communicating with the downward extension 144 are branch pipes, 146 and 147, which communicate with the interior of the heating chamber 3 between the runs of the respective compressors 27 and 26, as shown by Figure 4. A damper, 148, is provided in the pipe 144 between the branches 146 and 147, and a damper 149 is located in the branch pipe 146. The extension 145 of the air duct or pipe 143 is provided with branch pipes, 150 and 151, which communicate with the cooling chambers between the runs of the respective compressors 45 and 46. A damper 152, is interposed in the pipe extension 145 between the branches 150 and 151, and a damper, 153, is located in the branch pipe 150. A damper, 154, is located in the air pipe 143 on one side of the point of communication therewith of the pipe 142 and a damper 155 is located in said pipe on the other side of such point of communication.

From the above description, it will be seen that the utmost latitude is permitted in the application of air at different temperatures for acting upon the insulating material. Ordinarily, hot air will be admitted into the heating chamber 3 and cold air into the cooling chamber 4; for such operation and using only the heater 115, the damper 123 would be closed and the dampers 122, 128 and 129 opened. Air drawn in through the inlet pipe 116 and heated will then be forced by fan 112 upward in the extension 124 and out through the branches 126 and 127 between the two compressors 26 and 27 to heat the insulating material. If a greater volume of heated air is required in the heating chamber the heater 137 would be brought into use in which event the damper 155 would be closed and the dampers 154, 148 and 149 would be open, allowing the heated air to pass through the branch pipes 146 and 147 to the interior of the heating chamber.

If it be desired to supply heated air to both chambers, either with the use of one or both of the heaters 115 and 137, then either all of the dampers in the various pipes would be opened, allowing the heated air to be forced from both heaters into both chambers or with all the other dampers opened, the dampers 123 and 154 could be closed, allowing heated air from either 115 to enter the heating chambers 3 only, and heated air from the heater 137 to enter the cooling chamber 4. In like manner, without the heaters being in operation, cold air could be supplied to either, or both, chambers. Either of the air supplying systems can be used independently of the other for supplying heated air, or cold air, to one or both of the chambers 3, 4.

In what might be termed the normal operation of the system, that is to say, with heated air being supplied to the chamber 3 and cold air to the chamber 4, either of the heaters 115 or 137 can be used for supplying heated air to the heated chamber, and the other, with the heater cut out, of course, for supplying cold air to the chamber 4. The setting of the dampers for such operations will be apparent from an inspection of Figure 3.

With either heater in operation the volume of air drawn in may be regulated by the dampers 117 and 139, respectively, and the temperature of the air passing to the fans may be controlled by the dampers 119 and 141, respectively.

The endless compressors which I employ, and which permit ready permeation of the insulating material being compressed, and while under pressure, by the heated or cooled air, either or both, will now be described as to one of said elements, all of the compressors being of the same construction:

Referring particularly to Figures 5 and 6 the numeral, 156, indicates a series of channel irons, or plates, provided throughout their length with perforations, 157, and connected at their opposite ends, as indicated at, 158, to the links, 159, of an endless roller chain, the rollers whereof are indicated by the numerals 160. The rollers 160 on the lower run of the compressor 27 travel between flanged rails, 161, extending longitudinally of each chamber, and the rollers 160 on the upper run of the compressor 26 travel on and are supported by longitudinal rails, 162, also extending from end to end of the respective chambers. Thus, both compressors are caused to travel in parallel planes as to their opposed compressing surfaces. The rollers 160 are of a size and so positioned as to pass between the teeth of the sprocket wheels 34, 36, etc., and thus, with their links, providing sprocket chains to be engaged and driven by said sprockets.

In order to provide for the continuous movement of the insulating material from the inlet 5 to a receiving table, 163, extending from an outlet opening, 164, at the opposite end of the casing, I provide an endless wire mesh belt, 165, which extends the entire length of the machine and is supported on and travels with the respective compressors 27 and 45, and a similar wire mesh belt, 166, which is supported on and travels with the endless compressors 26 and 46.

In order to prevent undue interchange of heat between the chambers 3 and 4 and the outer air, I preferably form the partition 2 and the walls of the casing 1 of insulating material, or line the same with insulating material if metal be employed in the construction.

From the foregoing description, it will be seen that the treated insulating material, whether of mineral wool or of other compressible substance, may be continuously delivered by the endless carrier 8 through the opening 5 in one end of the casing, and that the same will be compressed and carried through the heating chamber 3 by the compressors 26 and 27, and that the compressor 27 may be raised and lowered through the engagement of the worm wheels 107 with the screw-threaded rods 108 to regulate the degree of compression and the thickness and density of the material. From the heating chamber the compressed material is carried by the wire mesh belts 165 and 166, between the compressors 45 and 46, and is ultimately delivered through the outlet 164 onto the receiving table 163.

During its passage through the heating chamber 3 and while under compression, heated air is supplied to the heating chamber 3 between the runs of the compressors therein from the branch pipes 126 and 127, and also through the branch pipes 146 and 147, if desired, and said heated air can readily permeate the compressed material by passing through the perforations 157 in the plates of the upper and lower compressor. In like manner, the compressed material passes through the cooling chamber 4, where it is subjected to the action of cooled air entering through the branch pipes 130 and 131 and also, if desired, through the branch pipes 150 and 151.

The air, whether hot or cold, is projected into the chambers under such force as to readily penetrate the material. If for example, asphalt be employed as the binder, the heated air will be of sufficient temperature to drive off the volatile ingredients, or otherwise dry or set the same, as the uses to which the material is to be applied may indicate. In passing through the cooling chamber 4, the material is cooled and the binder further set or hardened, so that the finished insulating material passing from the machine may be handled without inconvenience.

A distinguishing feature of this invention is the fact that it provides for setting or fixing the binder while the material is under compression, so that the material will remain of the thickness imparted to it by the compressors when it passes out of the machine.

As indicated above, it will now be obvious that variations in the character of air treatment may be readily effected, both as to temperature and length of treatment, by the means I have described. As to the latter feature, this is controlled by the variable speed device 54, which may be adjusted to pass the material through the chambers at any desired speed.

From the foregoing description it will be seen that I may set the binder either by the use of hot or cold air, or both. Where asphalt is used as the binder, I may use air at a temperature sufficient not only to drive off the volatile ingredients but to carbonize the asphalt. In other cases, I may simply set the asphalt by hardening the same with the use of cold air. Again, I may use hot air of sufficient temperature to merely melt or soften the asphalt to cause thorough adhesion of the fibers with each other and then set or harden the binder with the use of cold air.

The temperature of the heated air employed may range from room temperature to, say, 900° F.

In many cases, I use various kinds of oils in conjunction with the binder, the oil being used for annealing or softening the fibers during the process of manufacture. Where such process is employed, the oil will be vaporized by the heated air at the same time that the binder is set or hardened.

As practiced heretofore, mineral wool and other fibrous materials have been mixed with a binder in beaters, or agitating machine, and it is known that in such method of procedure the fibers are broken down, resulting in the production of a more or less granular block, or sheet. It is moreover difficult to uniformly dry such a product.

The present process enables long fibers to be pressed into block form and to be dried, or the binder to be set, after the material has been compressed to its finished form and density, resulting in the production of a product far superior both as to character and insulating efficiency to any product produced by the common, or what may be termed, wet process.

I claim:

1. A machine for making insulating material in sheet form, comprising a casing divided into two communicating chambers, a pair of opposed endless compressors located, respectively, in each of said chambers at corresponding compressing distances apart relative to the original thickness of material to be passed between them, and in line with each other, means for continuously passing a compressible insulating material mixed with a binder between the successive sets of compressors, and means for subjecting the material to hot air in the first of said chambers and to cold air in the second chamber while maintained under pressure by the compressors in the respective chambers.

2. A machine for making insulating material in sheet form, comprising a casing divided into two communicating chambers, a pair of opposed endless compressors located in the respective chambers at corresponding compressing distances apart relative to the original thickness of material to be passed between them, and in line with each other, means for continuously passing compressible insulating material mixed with a binder between the successive sets of compressors, means for simultaneously adjusting the upper compressors of the two sets toward and from the lower compressors, to vary the compressing distances between the compressors, and means for setting the binder by forcing air at varying temperatures into contact with the insulating material while the same is passing through the respective chambers under pressure of the compressors.

3. A machine for making insulating material in sheet form comprising a casing divided into two communicating chambers, a pair of opposed endless compressors located in the respective chambers at corresponding compressing distances apart relative to the original thickness of material to be passed between them, and in line with each other, a pair of endless meshed wire belts inclosing the upper and lower sets of compressors, and forming opposed compressing surfaces to provide a continuous passage of the insulating material between the two aligning sets of compressors, means for continuously feeding a compressible insulating material mixed with a binder between the compressors of one set at one end of the latter, means for simultaneously adjusting the upper compressors of the two sets toward and from the lower compressors to vary the compressing distance between the compressors, and means for setting the binder by forcing air at varying temperatures into contact with the insulating material while the same is passing through the respective chambers under pressure of the compressors.

4. A machine for making insulating material in sheet form, comprising a casing divided into two communicating chambers, a pair of opposed endless compressors located in the respective chambers at corresponding compressing distances apart relative to the original thickness of material to be passed between them, and in line with each other, means for driving all of said compressors simultaneously at the same rate of speed, means for guiding the opposed runs of the respective sets of compressors to cause them to travel in fixed parallel planes, means for continuously passing compressible insulating material mixed with a binder between the successive sets of compressors, means for simultaneously adjusting the upper compressors of the two sets toward and from the lower compressors, to vary the distance between the compressors, and means for setting the binder by forcing air at varying temperatures into contact with the insulating material while the same is passing through the respective chambers under pressure of the compressors.

5. A machine for making insulating material in sheet form comprising a casing divided into two communicating chambers, a pair of lower endless compressors located in the respective chambers in line with each other, a frame slidably mounted in each chamber, a pair of upper endless compressors located, respectively, in said frames in line with each other, means for simultaneously driving all of said compressors at the same rate of speed, means for varying the speed of travel of said compressors at the will of the operator, means for simultaneously raising and lowering said frames to move the upper compressors toward or from the lower compressors to adjust the distance between them relative to the original thickness of the material to be compressed, means for continuously passing compressible insulating material mixed with a binder between the successive sets of compressors, and means for setting the binder by forcing air at varying temperatures into contact with the insulating material while the same is passing through the respective chambers under pressure of the compressors.

6. A machine for making insulating material in sheet from, comprising a casing divided into two communicating chambers, a pair of opposed endless compressors located, respectively, in each of said chambers at corresponding compressing distances apart relative to the original thickness of material to be passed between them, and in line with each other, means for continuously passing a compressible insulating material mixed with a binder between the successive sets of compressors, and means for subjecting the material to air at varying temperatures in the respective chambers to set the binder, while the material is held under pressure by the compressors, comprising a heater having an air inlet, a combined suction and force feed fan communicating with said heater, pipes leading from the outlet of said fan to the respective chambers, a second air heating and forcing unit similar to the first and having pipes communicating with the respective chambers, and a series of dampers located in said pipes in a manner to permit air either hot or cold, according as the heaters are employed to be supplied from one or both units to either chamber, or to both chambers, or to permit heated air to be supplied to one chamber and cold air to the other chamber.

7. A machine for making insulating material in sheet form, comprising a casing divided into two communicating chambers, a pair of opposed endless compressors located, respectively, in each of said chambers at corresponding compressing distances apart relative to the original thickness of material to be passed between them, and in line with each other, means for continuously passing a compressible insulating material mixed with a binder between the successive sets of compressors, means for subjecting the material to hot air in the first of said chambers comprising a heater having an air inlet, a combined suction and force feed fan having a pipe connection with said heater, an air inlet communicating with said pipe and provided with a damper whereby to regulate the temperature of the air passing from said heater to said fan and a pipe leading from the outlet of said fan and having branch pipes communicating with said first chamber between the runs of the respective compressors therein, and a like means to that described for supplying cold air between the runs of the compressors of the second chamber.

8. In a machine of the class described, a series of pairs of opposed endless compressors arranged in line with each other, each of which compressors comprises a pair of endless sprocket chains having perforated plates connected to and extending between the same, means for causing the opposed runs of the compressors to travel in right lines in parallel relation to each other, a pair of endless meshed wire belts inclosing the upper and lower aligning compressors, respectively, of the series, and means for rotating all of said compressors simultaneously at the same rate of speed.

OLIVER F. MOTTWEILER.